F. E. SCHMIDT.
Aerial-Vessel.

No. 168,788. Patented Oct. 11, 1875.

Witnesses. Inventor.
James L. Norris Friedrich E. Schmidt.

UNITED STATES PATENT OFFICE.

FRIEDRICH E. SCHMIDT, OF HOBOKEN, NEW JERSEY.

IMPROVEMENT IN AERIAL VESSELS.

Specification forming part of Letters Patent No. 168,788, dated October 11, 1875; application filed September 2, 1875.

*To all whom it may concern:*

Be it known that I, FRIEDRICH E. SCHMIDT, of Hoboken, in the county of Hudson and State of New Jersey, have invented a new and useful Improvement in Aerial Vessels, which improvement is fully set forth in the following specification, reference being had to the accompanying drawing, in which—

Figure 1:
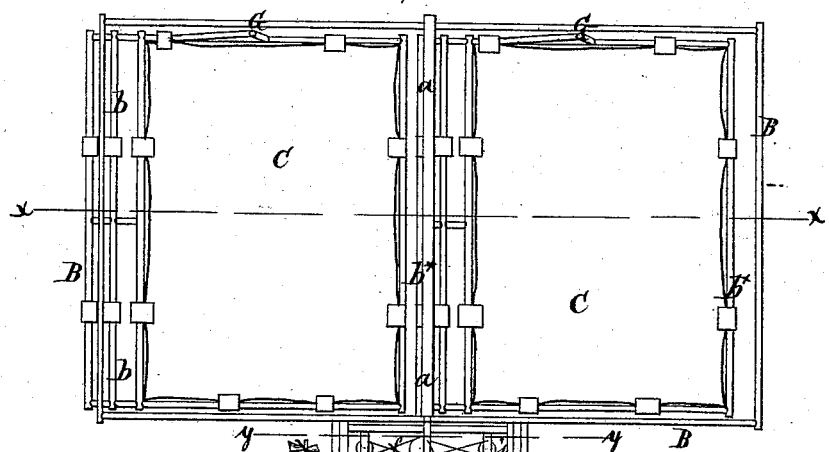
Figure 3:
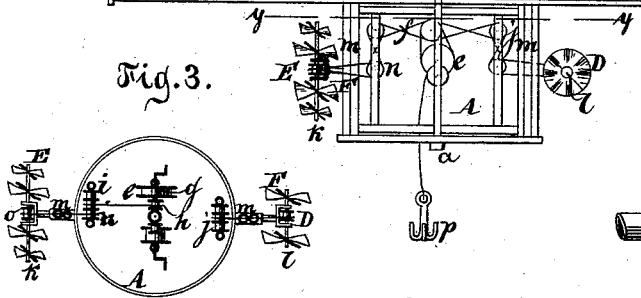
Figure 3:
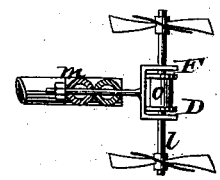
Figure 2:
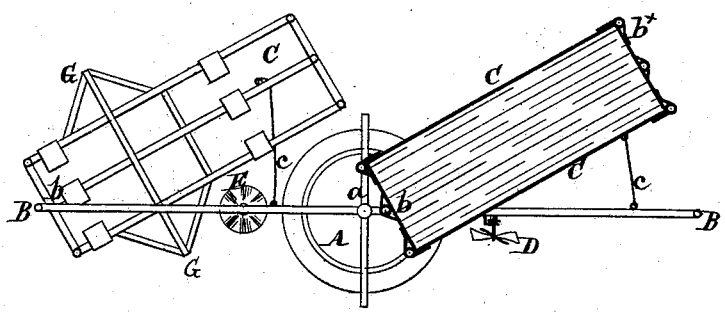
Figure 4:
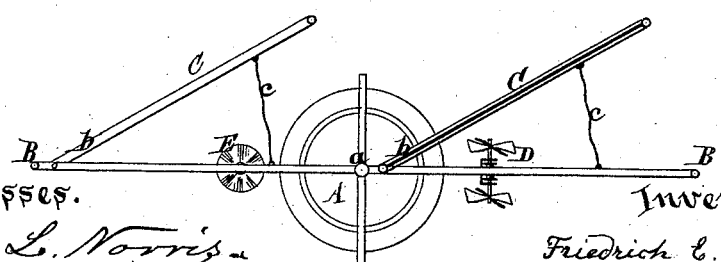

Figure 1 represents a sectional side view. Fig. 2 is a horizontal section in the plane $x\,x$, Fig. 1. Fig. 3 is a similar section in the plane $y\,y$, Fig. 1. Fig. 4 is a horizontal section of a modification of the sails shown in Fig. 2.

Similar letters indicate corresponding parts.

The principle of my invention of a manageable aerial vessel is based on the construction of the vessel, as shown in the drawing, said vessel being composed of a center-post, a supporting-frame, sails, and posts for sustaining said sails, which form or produce the propelling-power of the aerial vessel, by catching the wind like a sailing-vessel in water.

My invention consists also in the construction of the wheel or passenger house with its fly-wheel, transmitting-pulleys, and propeller-screws, which form or produce the power for raising, lowering, or steering the aerial vessel, the fly-wheel being turned either by human power, or by a mechanical motor fit for air-navigation.

In Figs. 1, 2, and 3 I have shown my manageable aerial vessel without a balloon. The material for the frames and the machinery of the aerial vessel—consisting of post $a$, frame B, frame sail-yards and frame $b\,b^*$, frame for wheel-house with top and bottom A, fly-wheel $e$, transmitting-pulleys $g\,h\,i\,j\,n\,o$, propeller-screws D E, Figs. 1 and 3—must be of a light and firm substance, such as hard rubber, which can be molded in any desirable shape. The stout or thick parts are made hollow. The sails C C, Figs. 1 and 2, are made of a light and close textile fabric, which is rendered air-tight by suitable means, said sails being filled with gas, so that the same, by reason of their gaseous contents, form the sustaining-power, and by reasons of their action on the wind the propelling-power, of the aerial vessel.

The propeller-screws D E, Figs. 1 and 3, form the power for raising, depressing, and steering the aerial vessel. For instance, if both propeller-screws D E are set in motion by turning the fly-wheel $e$, one screw being turned to the right and the other to the left, the aerial vessel is turned or "tacked," and thereby the sails C C, Figs. 1, 2, and 4, are turned by the wind on the opposite side of the aerial vessel and sustained by the ropes $c\,c$, so that the vessel assumes a different course. The frame sail-yards $b$, Figs. 1, 2, and 4, are secured in the frame B by pivots, so that the sails C C, together with the frames $b\,b^*$, can swing toward the right or left, being turned by the wind. The wheel or passenger house A is fastened to the frame B B, Figs. 1, 2, and 4. If the forward propeller-screw E is set at rest by moving back the pulley $n$, Figs. 1 and 3, so that the rear propeller-screw D moves alone, this last-named screw forms the rudder of the aerial vessel against the wind, said screw being turned either to the right or to the left according to the prevailing direction of the wind. If both propeller-screws D E, Figs. 1 and 3, are turned in a vertical position by means of a lever acting on the swivel-brackets F, Figs. 3 and 3*, and both are kept in motion, they serve to raise or to depress the aerial vessel. The propeller-screws D E are set in motion by means of the fly-wheel $e$ and the transmitting-pulleys $g\,h\,i\,j\,n\,o$, and they have to revolve with considerable velocity, which is produced by the fly-wheel and the transmitting-pulleys. The propeller-screws D E are mounted on the ends of shafts $l\,k$, each of which carries in its middle a pulley, $o$, Figs. 1, 3, and 3*. The swivel-brackets F form the bearings for the shafts of the propeller-screws D E, and they are secured by means of their screw-shanks in the rods $m\,m$, Figs. 1, 3, and 3*, in such a manner that they can be turned as desirable. On the top of the frame-sails $b\,b^*$ is secured a rod, G, with braces, Figs. 1 and 2, which prevents the sails C C, when filled with gas, from rising above the frame B. The anchor $p$ with its windlass and rope, Figs. 1 and 3, serves for landing the aerial vessel.

If the sustaining-power of the gas-charged sails C C, Fig. 2, should not be sufficient to support the aerial vessel with two persons, their employment would still be desirable, because a balloon of small size could then be employed, and in case of danger the gas could be let off from the balloon, and a safe landing could be effected.

In Figs. 1, 3, and 4 I have shown my manageable aerial vessel when a balloon is required. In this case the balloon, being filled with gas, forms the supporting-power, the sails C C, Fig. 4, the propelling-power, and the propelling-screws D E, Figs. 1 and 3, the steering-power of the aerial vessel on the same principle as described above in the aerial vessel without a balloon.

The sails C C, Fig. 4, are made of a light and close textile fabric, which is rendered water-tight by a preparation of hot water, soap, and alum, which prevents the sails from absorbing moisture.

The vessel is secured to the balloon by blocks and falls and double ropes, so that it can be raised and lowered, and by means of a turn-table it can be turned freely without turning the balloon.

What I claim as new, and desire to secure by Letters Patent, is—

1. The construction of an aerial vessel, as shown in the drawing, Fig. 1, composed of the folding parts, viz.: post $a$, frame B, sails C, and frame sail-yards and frame $b\ b^*$ for propelling the aerial vessel by catching the wind, also the wheel or passenger house A, fly-wheel $e$, transmitting-pulleys $g\ h\ i\ j\ n\ o$, propeller-screws D E, swivel-brackets F for raising, lowering, and steering the aerial vessel by turning the fly-wheel, substantially as set forth.

2. The combination of vertical swivel rods and frame $b\ b^*$ with sails C C, as shown in the drawing, Figs. 1, 2, and 4, substantially as described.

3. The combination of propeller-screws D E, which have their bearings in the swivel-brackets F, as shown in the drawing, Figs. 1 and 3, substantially as described.

4. The combination of a wheel or passenger house A, of buoyant sails C C forming air-tight chambers filled with gas, as shown in the drawing, Figs. 1 and 2, substantially as described.

In testimony that I claim the foregoing I have hereunto set my hand and seal this 25th day of August, 1875.

FRIEDRICH E. SCHMIDT. [L. S.]

Witnesses:
 ALBERT REINERT,
 PETER BOYN.